(12) United States Patent
Yamasaki (10) Patent No.: US 9,350,919 B2
(45) Date of Patent: May 24, 2016

(54) IMAGE PICKUP APPARATUS

(71) Applicant: CANON KABUSHIKI KAISHA, Tokyo (JP)

(72) Inventor: Shinji Yamasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/698,017

(22) Filed: Apr. 28, 2015

(65) Prior Publication Data

US 2015/0326792 A1  Nov. 12, 2015

(30) Foreign Application Priority Data

May 7, 2014  (JP) .................................. 2014-095810

(51) Int. Cl.

| | |
|---|---|
| *G02B 15/14* | (2006.01) |
| *H04N 5/232* | (2006.01) |
| *G03B 13/34* | (2006.01) |
| *H04N 5/225* | (2006.01) |
| *G02B 15/20* | (2006.01) |
| *G02B 15/177* | (2006.01) |
| *G02B 13/00* | (2006.01) |
| *G02B 13/04* | (2006.01) |
| *G02B 15/163* | (2006.01) |
| *G02B 5/00* | (2006.01) |

(52) U.S. Cl.
CPC ............ *H04N 5/23296* (2013.01); *G03B 13/34* (2013.01); *H04N 5/2253* (2013.01); *H04N 5/2254* (2013.01); *G02B 5/005* (2013.01); *G02B 13/009* (2013.01); *G02B 13/0045* (2013.01); *G02B 13/04* (2013.01); *G02B 15/163* (2013.01); *G02B 15/177* (2013.01); *G02B 15/20* (2013.01)

(58) Field of Classification Search
CPC .... G02B 15/20; G02B 13/009; G02B 15/163; G02B 13/0045; G02B 15/177; G02B 13/04; G02B 5/005
USPC .......... 359/683–685, 691, 717, 740, 753, 793
See application file for complete search history.

(56) References Cited

U.S. PATENT DOCUMENTS

| 7,907,351 | B2 * | 3/2011 | Tomioka | ............... | G02B 15/177 |
|---|---|---|---|---|---|
| | | | | | 359/680 |
| 8,928,991 | B2 * | 1/2015 | Nakamura | ............ | G02B 15/14 |
| | | | | | 359/683 |
| 2009/0219627 | A1 * | 9/2009 | Tomioka | ............... | G02B 15/177 |
| | | | | | 359/691 |
| 2012/0044576 | A1 * | 2/2012 | Okumura | ............. | G02B 15/173 |
| | | | | | 359/686 |

FOREIGN PATENT DOCUMENTS

| JP | 2011-112909 A | 6/2011 |
|---|---|---|
| JP | 2011-175174 A | 9/2011 |

* cited by examiner

*Primary Examiner* — Evelyn A Lester
(74) *Attorney, Agent, or Firm* — Carter, DeLuca, Farrell & Schmidt, LLP

(57) ABSTRACT

Provided is an image pickup apparatus including a zoos lens and a solid-state image pickup element. The zoom lens includes a first lens unit having a negative refractive power, an aperture stop, and a second lens unit having a positive refractive power. The first lens unit consists of a first lens sub-unit having a negative refractive power, which consists of two negative lenses, and a second lens sub-unit having a positive refractive power. The first lens unit and the second lens unit are configured to move in different loci for zooming. Each of a full-open f-number (Fnow) of the zoom lens, a focal length of the zoom lens, a focal length of the first lens sub-unit, and a pixel pitch (P) of the solid-state image pickup element is appropriately set.

8 Claims, 10 Drawing Sheets

IMAGE PICKUP APPARATUS

BACKGROUND OF THE INVENTION

1. Field of the Invention

The present invention relates to an image pickup apparatus suitable for, for example, a video camera, a monitoring camera, a digital still camera, or a broadcasting camera, which uses a solid-state image pickup element,

2. Description of the Related Art

As a photographing optical system used in an image pickup apparatus including a high definition solid-state image pickup element, a zoom lens having a wide angle of field and sufficiently high optical performance has been in demand. In particular, in view of increasing image quality, an optical system having high optical performance capable of satisfactorily adapting to an image pickup element having the number of pixels ranging from Standard Definition (SD) image quality to megapixel or full High Definition (HD) image quality or more has been sought for.

As a zoom lens satisfying those demands, in each of Japanese Patent Application Laid-Open No. 2011-112909 and Japanese Patent Application Laid-open No. 2011-175174 there is disclosed a negative lead type two-unit zoom lens consisting of, in order from an object, side to an image side, a first lens unit having a negative refractive power and a second lens unit having a positive refractive power, in which the both lens units are moved to perform zooming.

In recent years, a zoom lens used in a monitoring camera has been required to have a wide angle of field so as to be able to photograph a wide range. The zoom lens has also been required to be an optical system having a small f-number (FNO) so as to be able to capture a clear image even in night photography. In addition, in twilight and night photography, it has been required that a chromatic aberration be satisfactorily corrected in a wide wavelength range from visible light to a near-infrared region, that a defocus be small, and the like to facilitate photography under low illuminance using near-infrared light having a wavelength of 800 nm to 1,000 nm. Further, the zoom lens has been required to be small to facilitate installation in any place indoor and outdoor.

In the negative lead type two-unit zoom lens described above, in order to obtain the high optical performance over an entire zoom range while the zoom lens is small and has the wide angle of field, it becomes important to appropriately set lens configurations of the lens units. In order to obtain an image in which the chromatic aberration is satisfactorily corrected in the wide wavelength range from a visible range to a near-infrared range and the defocus is small, it becomes important to configure the optical system so that a difference in focal length of the zoom lens is small in the wide wavelength range.

The two-unit zoom lens described in Japanese Patent Application Laid-Open No. 2011-112909 is increased in relative aperture and reduced in size, but has a tendency for focus movement to increase in the near-infrared range. The two-unit zoom lens described in Japanese Patent Application Laid-Open No. 2011-175174 supports the wide wavelength range from a visible light range to a near-infrared light range and has the high optical performance supporting megapixelation, but movement amounts of the first lens unit and the second lens unit for zooming are large to increase the size of the zoom lens.

SUMMARY OF THE INVENTION

According to one embodiment of the present invention, there is provided an image pickup apparatus, including; a zoom lens; and a solid-state image pickup element configured to receive an image formed by the zoom lens, the zoom lens including, in order from an object side to an image side: a first lens unit having a negative refractive power; an aperture stop; and a second lens unit having a positive refractive power, the first lens unit consisting of, in order from the object side to the image side, a first lens sub-unit having a negative refractive power, which consists of two negative lenses, and a second lens sub-unit having a positive refractive power, the first lens unit and the second lens unit being configured to move along different loci during zooming, in which the following conditional expressions are satisfied:

$$1.5 < F_{now} \cdot ((f_{wr}-f_w)/P) < 9.5;$$

$$5.0 < F_{not} \cdot ((f_{tr}-f_t)/P) < 28.0; \text{ and}$$

$$-1.80 < f1a/\sqrt{(f_w \cdot f_t)} < -1.22,$$

where Fnow represents a full-open f-number of the zoom lens at a wide angle end, Fnot represents a full-open f-number of the zoom lens at a telephoto end, fw represents a focal length of the zoom lens at the wide angle end with respect to a d-line (wavelength: 587.6 nm), ft represents a focal length of the zoom, lens at the telephoto end with respect to the d-line (wavelength: 587.6 nm), fwr represents a focal length of the zoom lens at the wide angle end with respect to light having a wavelength of 850 nm, ftr represents a focal length of the zoom lens at the telephoto end respect to the light having the wavelength of 850 nm, f1a represents a focal length of the first lens sub-unit with respect to the d-line (wavelength: 587.6 nm), and P represents a pixel pitch of the solid-state image pickup element.

Further features of the present, invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A zoom lens and an image pickup apparatus including the same of the present invention are described as follows. The zoom lens used, in the image pickup apparatus of the present invention includes, in order from an object side to an image side, a first lens unit having a negative refractive power, an aperture stop, and a second lens unit having a positive refractive power. Each of the lens units is configured to move so that an interval between the first lens unit and the second lens unit is changed for zooming.

Figure 1:
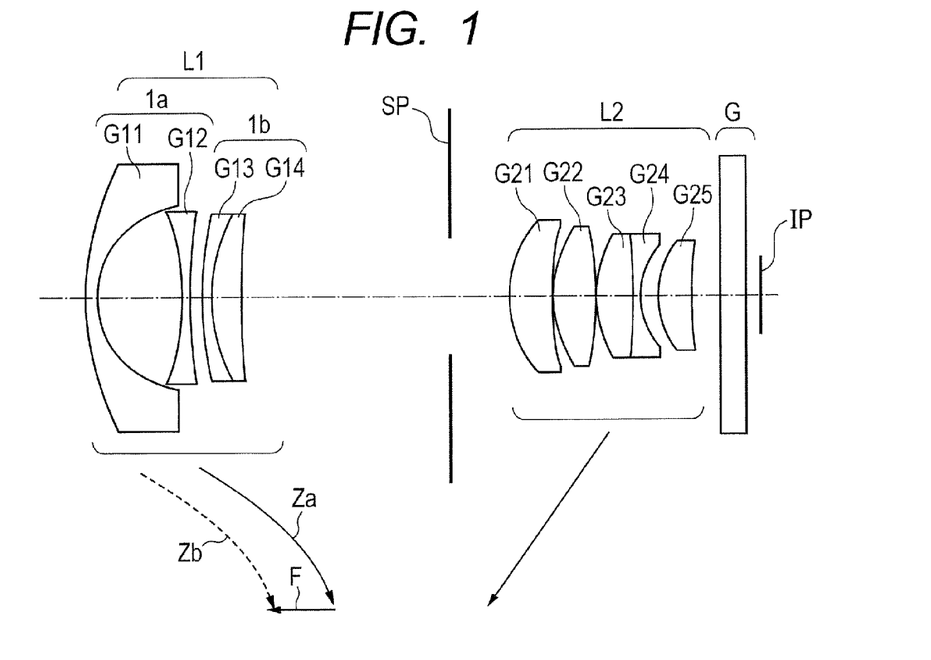
FIG. 1 is a lens cross-sectional view and a diagram of movement loci at a wide angle end of a zoom lens according to Embodiment 1.
Figure 2A:
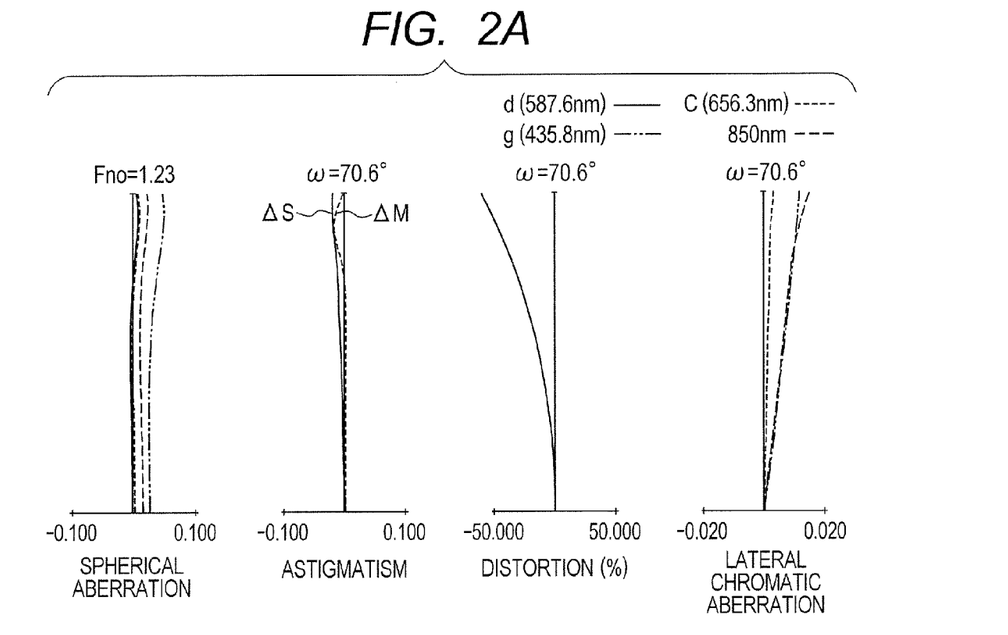
FIG. 2A is an aberration diagram at the wide angle end of the zoom lens according to Embodiment 1.
Figure 2B:
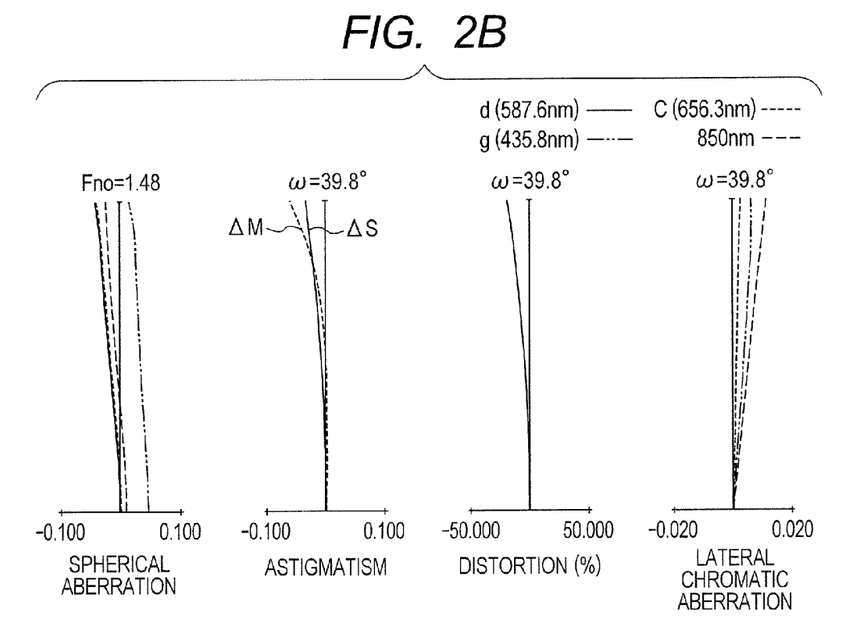
FIG. 2B is an aberration diagram at an intermediate zoom position of the zoom lens according to Embodiment 1.
Figure 2C:
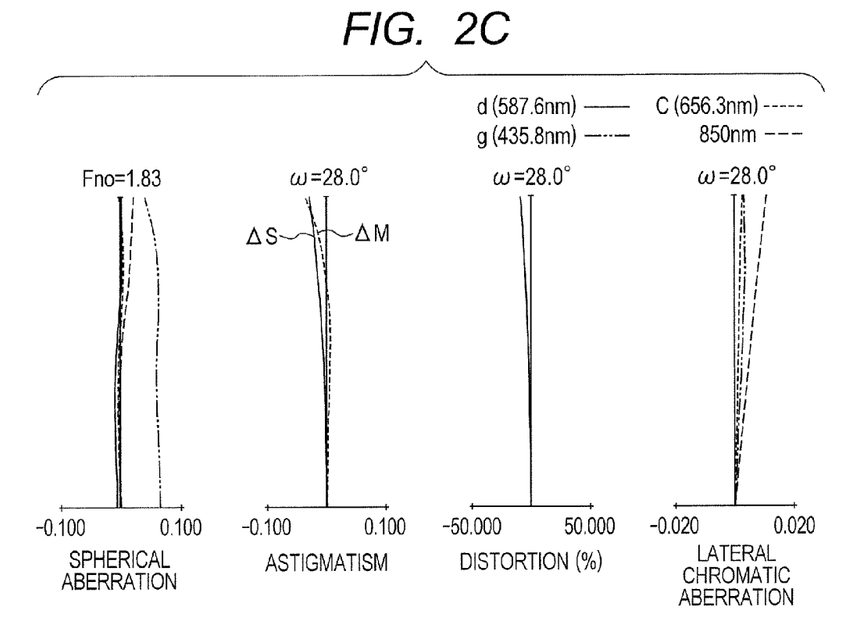
FIG. 2C is an aberration diagram at a telephoto end of the zoom lens according to Embodiment 1.

FIG. 1 is a lens cross-sectional view at a wide angle end (short focal length end) of a zoom lens used in an image pickup apparatus according to Embodiment 1 of the present invention. FIGS. 2A, 2B, and 2C are aberration diagrams at the wide angle end, an intermediate zoom position, and a telephoto end (long focal length end), respectively, of the zoom lens used in the image pickup apparatus according to Embodiment 1 of the present invention. The zoom lens according to Embodiment 1 has a zoom ratio of 2.33 and an aperture ratio of from 1.23 to 1.83.

Figure 3:
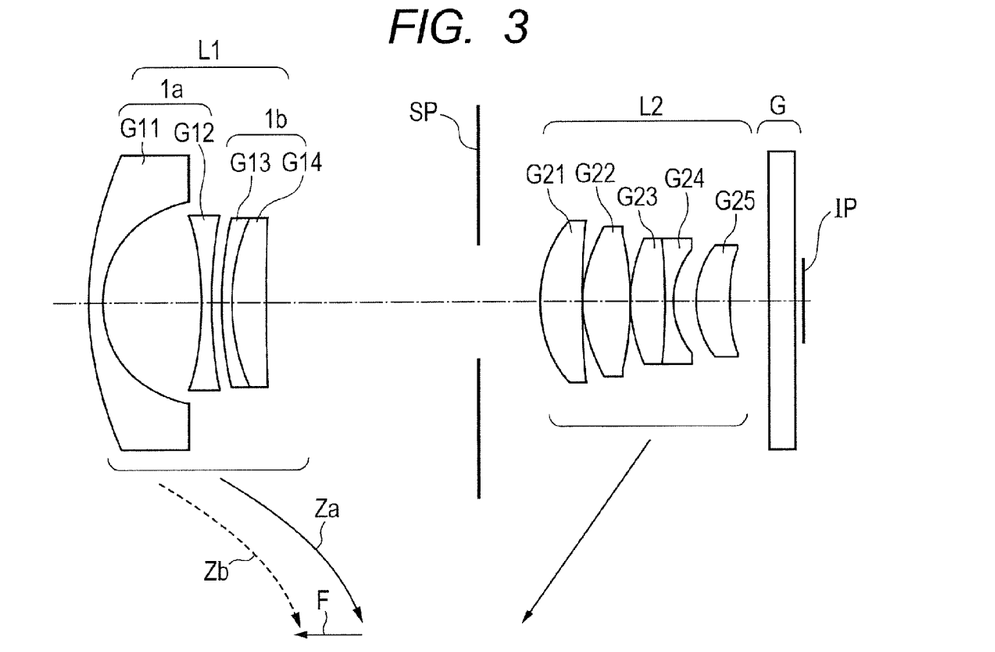
FIG. 3 is a lens cross-sectional view and a diagram of movement loci at a wide angle end of a zoom lens according to Embodiment 2.
Figure 4A:
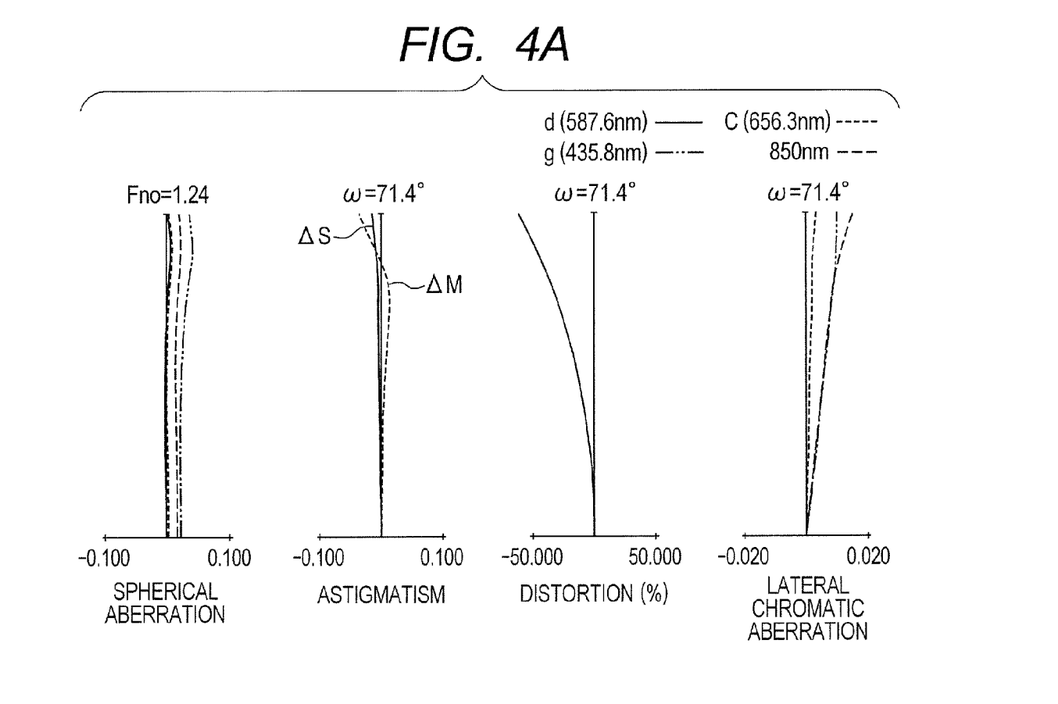
FIG. 4A is an aberration diagram at the wide angle end of the zoom lens according to Embodiment 2.
Figure 4B:
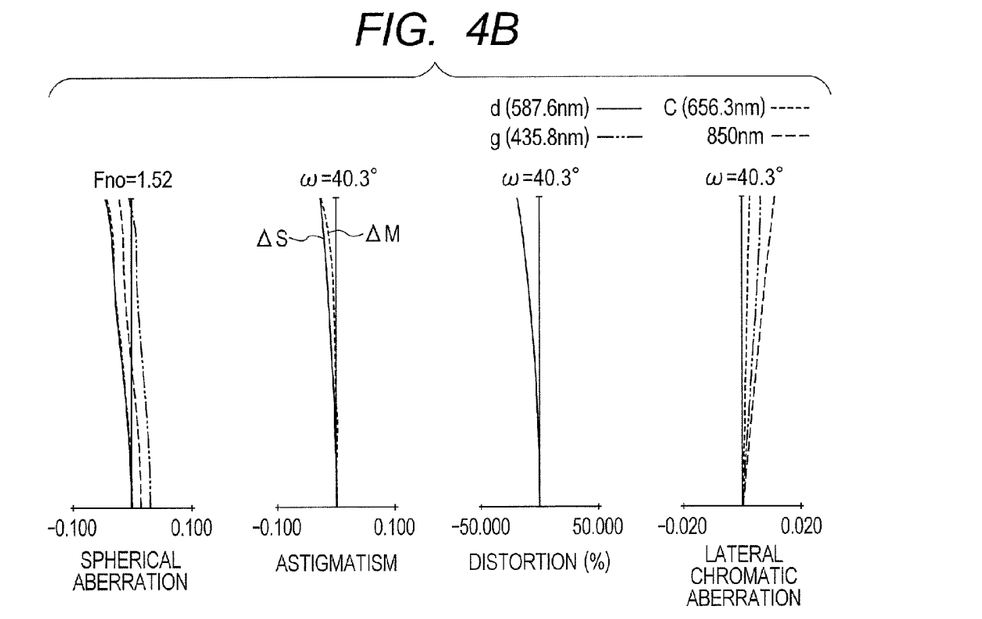
FIG. 4B is an aberration diagram at an intermediate zoom position of the zoom lens according to Embodiment 2.
Figure 4C:
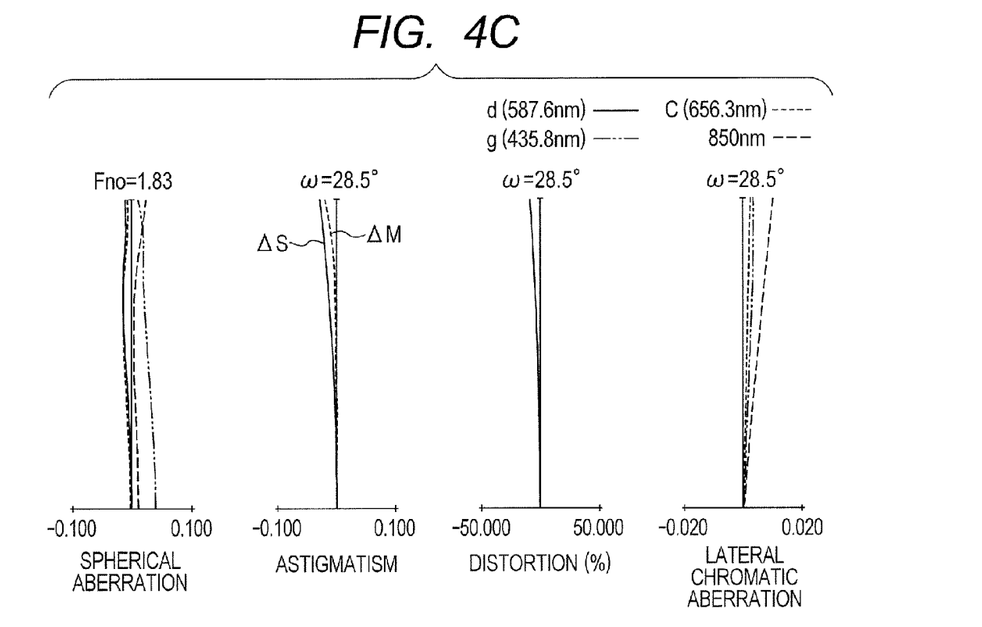
FIG. 4C is an aberration diagram at a telephoto end of the zoom lens according to Embodiment 2.

FIG. 3 is a lens cross-sectional view at a wide angle end (short focal length end) of a zoom lens used in an image pickup apparatus according to Embodiment 2 of the present invention. FIGS. 4A, 4B, and 4C are aberration diagrams at the wide angle end, an intermediate zoom position, and a telephoto end (long focal length end), respectively, of the zoom lens used in the image pickup apparatus according to Embodiment 2 of the present invention. The zoom lens according to Embodiment 2 has a zoom ratio of 2.28 and an aperture ratio of from 1.24 to 1.83.

Figure 5:
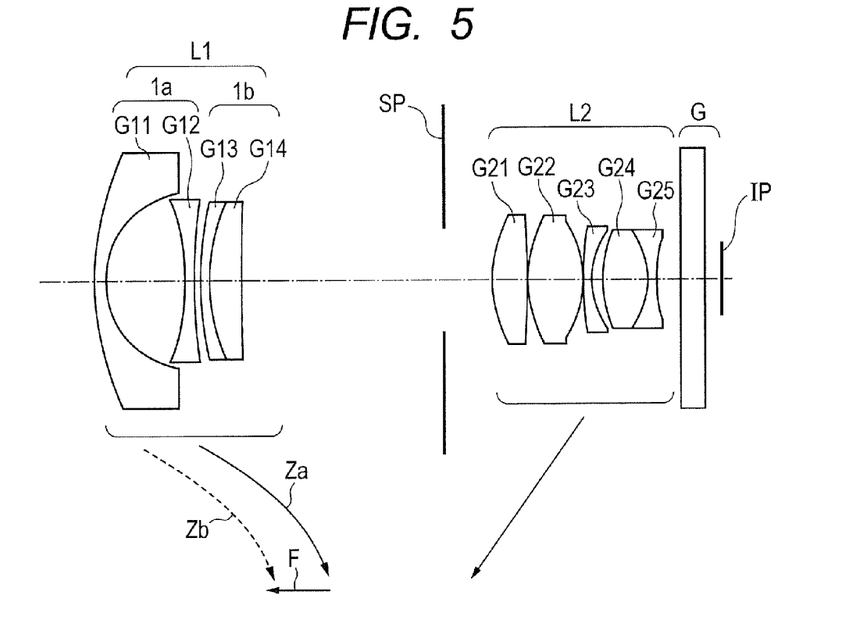
FIG. 5 is a lens cross-sectional view and a diagram of movement loci at a wide angle end of a zoom lens according to Embodiment 3.
Figure 6A:
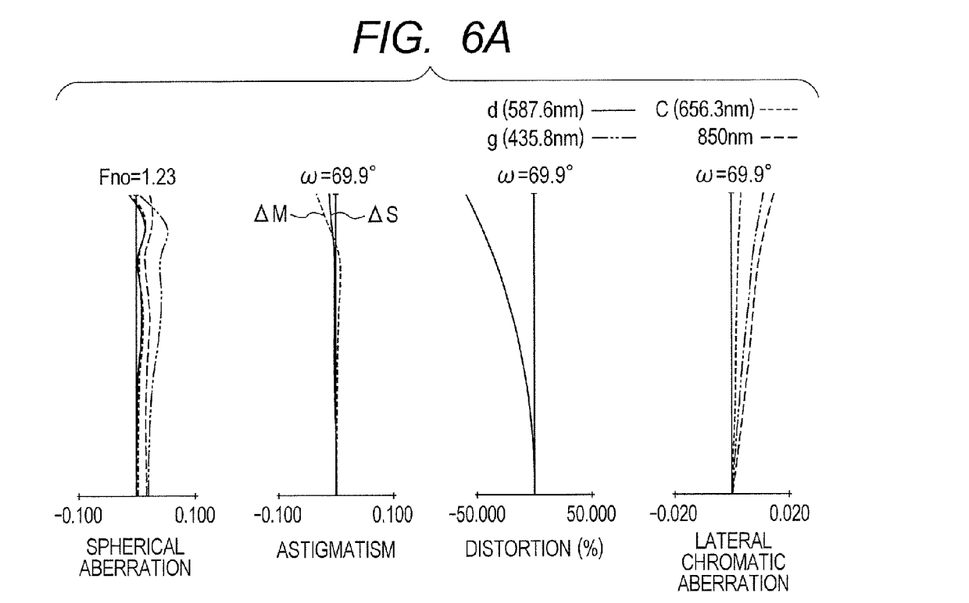
FIG. 6A is an aberration diagram at the wide angle end of the zoom lens according to Embodiment 3.
Figure 6B:
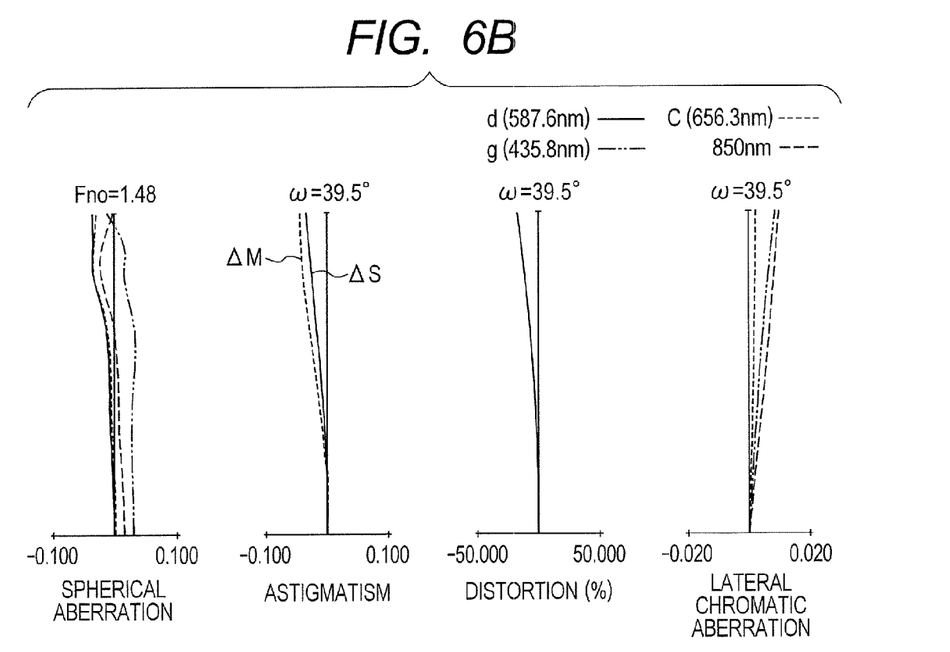
FIG. 6B is an aberration diagram at an intermediate zoom position of the zoom lens according to Embodiment 3.
Figure 6C:
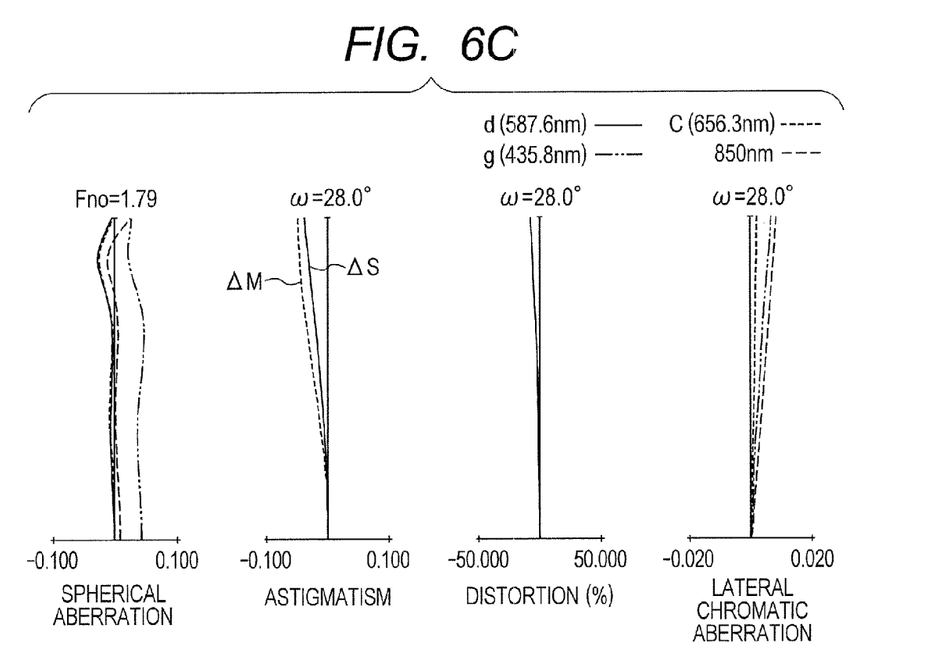
FIG. 6C is an aberration diagram at a telephoto end of the zoom lens according to Embodiment 3.

FIG. 5 is a lens cross-sectional view at a wide angle end (short focal length end) of a zoom lens used in an image pickup apparatus according to Embodiment 3 of the present invention. FIGS. 6A, 6B, and 6C are aberration diagrams at the wide angle end, an intermediate zoom position, and a telephoto end (long focal length end), respectively, of the zoom lens used in the image pickup apparatus according to Embodiment 3 of the present invention. The zoom lens according to Embodiment 3 has a zoom ratio of 2.30 and an aperture ratio of from 1.23 to 1.79.

Figure 7:
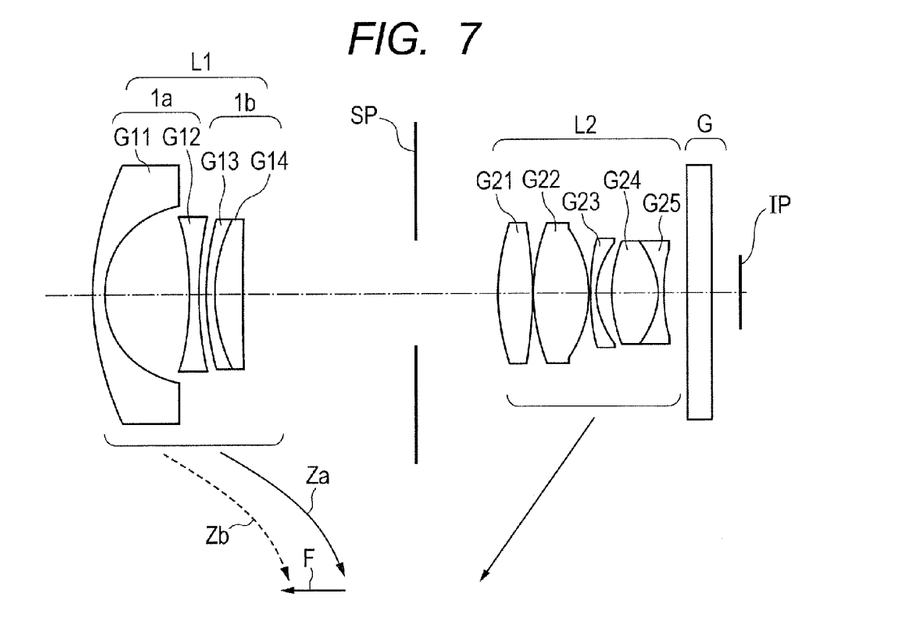
FIG. 7 is a lens cross-sectional view and a diagram of movement loci at a wide angle end of a zoom lens according to Embodiment 4.
Figure 8A:
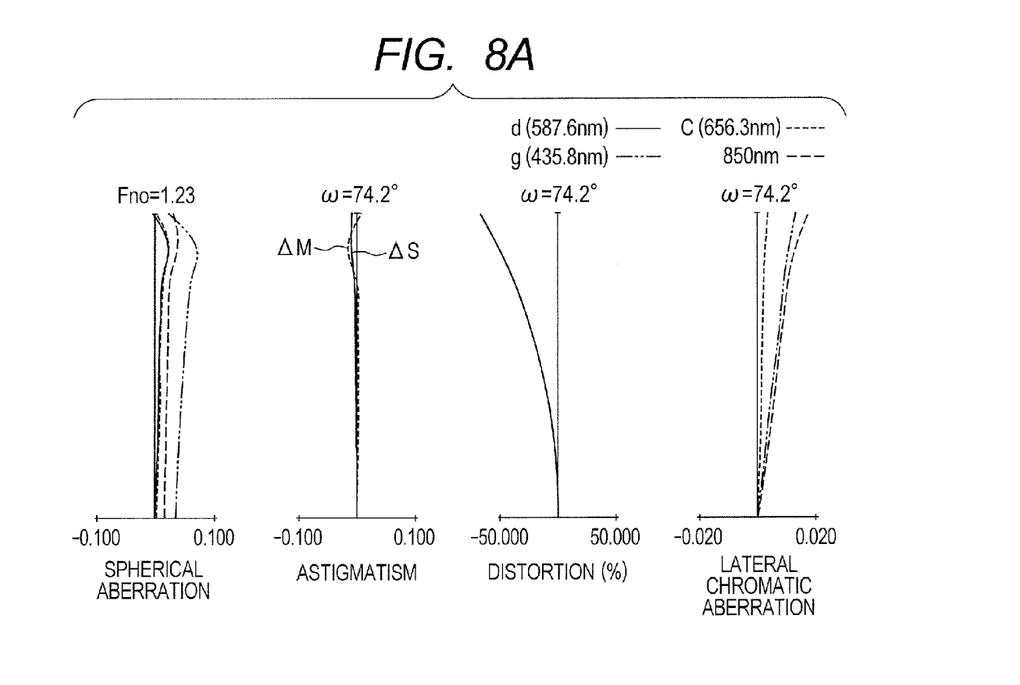
FIG. 8A is an aberration diagram at the wide angle end of the zoom lens according to Embodiment 4.
Figure 8B:
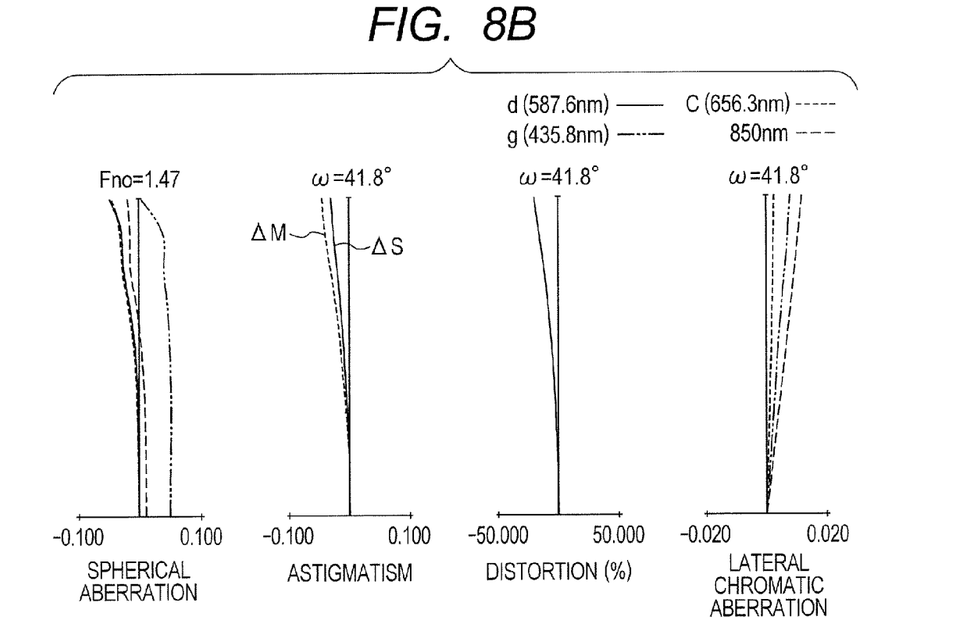
FIG. 8B is an aberration diagram at an intermediate zoom position of the zoom lens according to Embodiment 4.
Figure 8C:
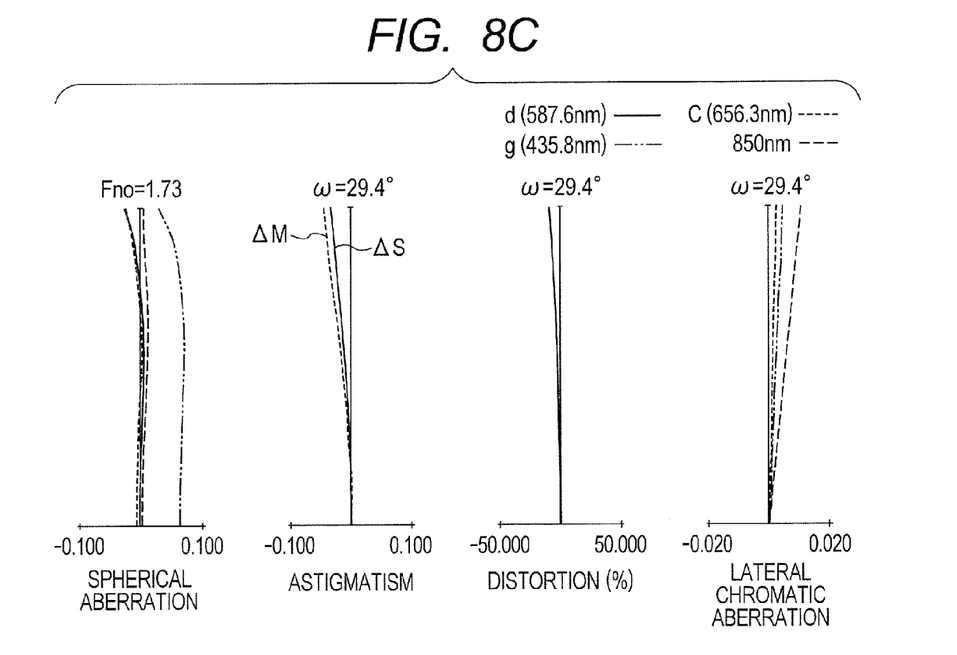
FIG. 8C is an aberration diagram at a telephoto end of the zoom lens according to Embodiment 4.

FIG. 7 is a lens cross-sectional view at a wide angle end (short focal length end) of a zoom lens used in an image pickup apparatus according to Embodiment 4 of the present invention, FIGS. 8A, 8B, and 8C are aberration diagrams at the wide angle end, an intermediate zoom position, and a telephoto end (long focal length end), respectively, of the zoom lens used in the image pickup apparatus according to Embodiment 4 of the present invention. The zoom lens according to Embodiment 4 has a zoom ratio of 2.31 and an aperture ratio of from 1.23 to 1.73.

Figure 9A:
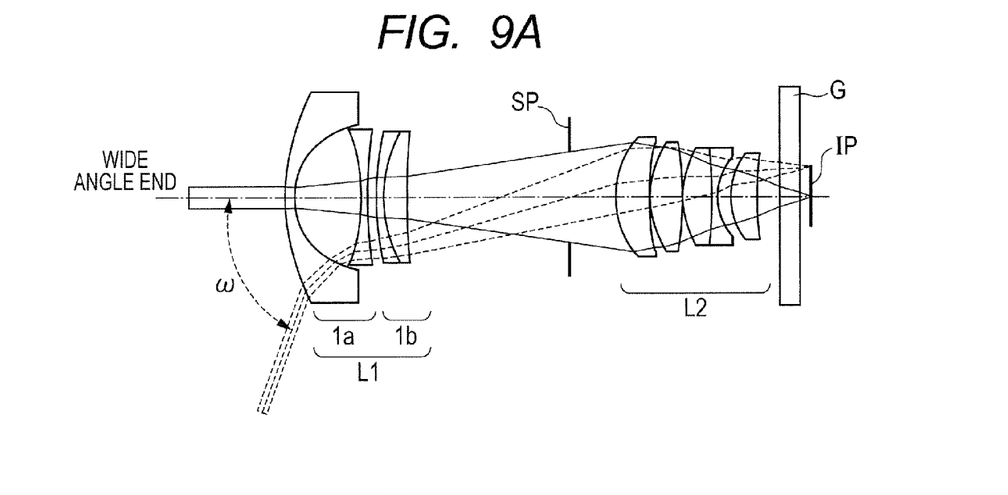
FIG. 9A is an optical path diagram at the wide angle end in the zoom lens according to Embodiment 1.
Figure 9B:
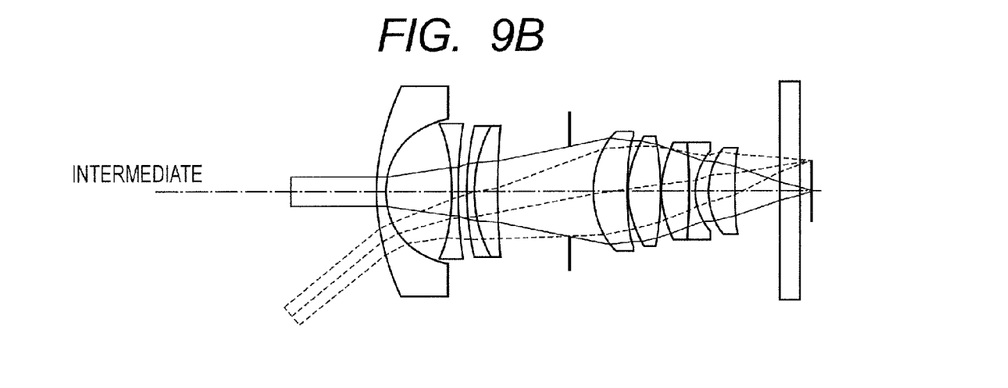
FIG. 9B is an optical path diagram at the intermediate zoom position in the zoom, lens according to Embodiment 1.
Figure 9C:
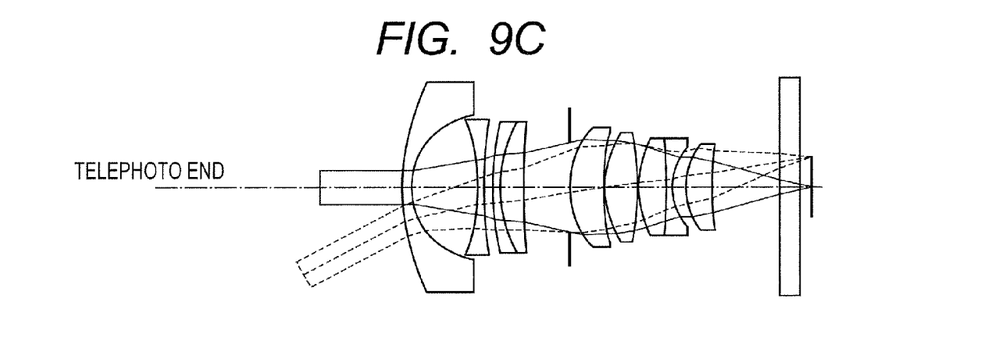
FIG. 9C is an optical path diagram at the telephoto end in the zoom lens according to Embodiment 1.
Figure 10:
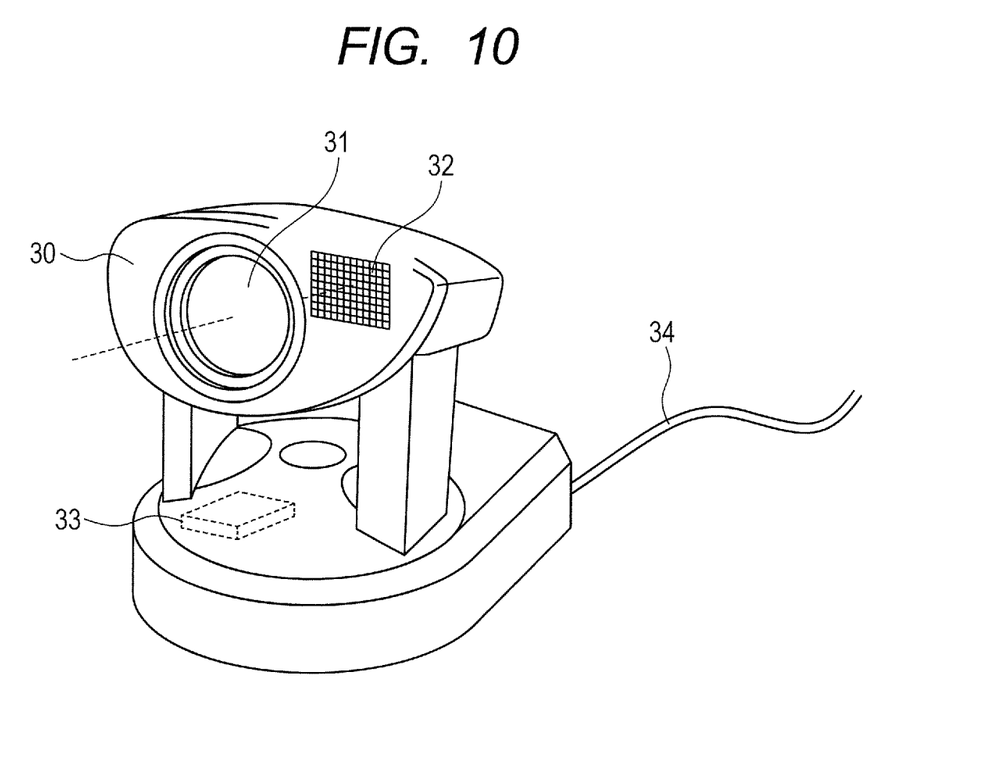
FIG. 10 is a schematic view of a main part of a monitoring camera (image pickup apparatus) according to the present invention.

FIGS. 9A, 9B, and 9C are optical path diagrams at the wide angle end, the intermediate zoom position, and the telephoto end, respectively, of the zoom lens according to Embodiment 1. The solid line indicates an axial ray, and the dotted line indicates a most off-axial ray. FIG. 10 is a schematic view of a main part of an image pickup apparatus according to the present invention.

In Embodiments, the wide angle end and the telephoto end refer to zoom positions when a lens unit for zooming (second lens unit L2) is located at both ends of a range in which the lens unit is mechanically movable on an optical axis. The zoom lens according to each of Embodiments is used in the image pickup apparatus. In the lens cross-sectional views, the left side is the object side (front side), and the right side is the image side (rear side). In the lens cross-sectional views and the optical path diagrams, a first lens unit having a negative refractive power (optical power-reciprocal of a focal length) is denoted by L1, and a second lens unit having a positive refractive power is denoted by L2. The first lens unit L1 consists of a lens sub-unit 1a (a first lens sub-unit) having a negative refractive power and a lens sub-unit 1b (a second lens sub-unit) having a positive refractive power.

The lens sub-unit 1a consists of two negative lenses, and of lenses included in the first lens unit L1, an optical system arranged on the image side of the lens sub-unit 1a is defined as the lens sub-unit 1b. An f-number determination member (hereinafter referred to also as "aperture stop") SP has a function of aperture stop for determining (limiting; a full-open f-number (Fno) ray. An optical block G corresponds to an optical filter, a face plate, a crystal low pass filter, an infrared cut filter, or the like. As an image plane IP, an image pickup surface of a solid-state image pickup element (photoelectric conversion element) such as a CCD sensor or a CMOS sensor is arranged when the zoom lens is used as an imaging optical system of a video camera or a digital still camera, The arrows indicate movement loci of the lens units for zooming from the wide angle end to the telephoto end. The arrow 2a concerning the first lens unit L1 indicates a movement locus for zooming from the wide angle end to the telephoto end when focusing on an object at infinity. Moreover, the arrow Zb indicates a movement locus for the zooming from the wide angle end to the telephoto end when focusing on an object at short distance. The arrow F indicates a movement direction of the first lens unit L1 for focusing on from an object at infinity to an object at short distance. The lens units forming the zoom lens are separated based on an interval change during zooming, and each of the lens units consists of one or a plurality of lenses.

In the aberration diagrams, regarding wavelengths, reference symbols d, g, and C shown in upper right of the aberration diagrams represent a d-line (wavelength: 587.6 nm), a g-line (wavelength: 435.8 nm), and a C-line (wavelength: 656.3 nm), respectively. The wavelength of 850 nm is also shown. In the astigmatism diagrams, reference symbols $\Delta M$ and $\Delta S$ represent a meridional image plane and a sagittal image plane with respect to the d-line, respectively. Reference symbols Fno and $\omega$ represent an f-number and a half angle of field (degrees), respectively.

The spherical aberrations show the d-line, the g-line, the C-line, and the wavelength of 850 nm, the astigmatisms snow $\Delta M$ and $\Delta S$ with respect to the d-line, and the distortions show the d-line. The lateral chromatic aberrations show aberrations of the C-line, the g-line, and the wavelength of 850 nm with respect to the d-line.

A zoom type of the zoom lens used in the image pickup apparatus according to the present invention is a negative lead, type two-unit zoom lens including two lens units. The interval between the first lens unit L1 having the negative refractive power and the second, lens unit L2 is changed to perform zooming, which is a lens configuration suitable for widening an angle of field. The second lens unit L2 having the positive refractive power, which is located on the image side, is moved, to perform the zooming, and an image plane variation accompanying the zooming is corrected by the first lens unit L1 having the negative refractive power on the object side.

The image pickup apparatus according to each of Embodiments includes the zoom lens and a solid-state image pickup element configured to receive an image formed by the zoom lens. The aperture stop SP is arranged between the first lens unit L1 and the second lens unit L2. The first lens unit L1 consists of, in order from the object, side to the image side, the lens sub-unit 1a having the negative refractive power,, which consists of two negative lenses, and the lens sub-unit 1b having the positive refractive power, which consists of a negative lens and a positive lens. The first lens unit L1 and the second lens unit L2 are configured to move along different loci for zooming.

The image pickup apparatus according to the present invention satisfies the following conditional expressions:

$$1.5 < Fnow \cdot ((fwr-fw)/P) < 9.5 \quad (1)$$

$$5.0 < Fnot \cdot ((ftr-ft)/P) < 28.0 \quad (2)$$

$$-1.80 < f1a/\sqrt{(fw \cdot ft)} < -1.22 \quad (3)$$

where Fnow represents a full-open, f-number at the wide angle end of the zoom lens, Fnot represents a full-open f-number at the telephoto end of the zoom lens, fw represents a focal length of the zoom lens at the wide angle end of the zoom lens with respect to the d-line (wavelength: 587.6 nm), ft represents a focal length of the zoom lens at the telephoto end of the zoom lens with respect to the d-line (wavelength: 587.6 nm), fwr represents a focal length of the zoom lens at the wide angle end of the zoom lens with respect to light having the wavelength of 850 nm, ftr represents a focal length of the zoom lens at the telephoto end of the zoom lens with respect to the light having the wavelength of 850 nm, f1a represents a focal length of the lens sub-unit 1a with respect to the d-line (wavelength: 587.6 nm), and P represents a pixel pitch of the solid-state image pickup element.

Next, the technical meanings of Conditional Expressions (1) to (3) are described. Note that, in the following description, without otherwise noted, various parameters indicate numerical values with respect to the d-line (wavelength: 587.6 nm) . Conditional Expressions (1) and (2) are set to reduce a defocus in a wide wavelength, range from visible light (wavelength: 400 nm to 700 nm) to near-infrared light and obtain high, resolving power in the wide wavelength range. Conditional Expressions (1) and (2) are also defined including the focal lengths with respect to the near-infrared light (850 nm) and the d-line (wavelength: 587.6 nm), the f-number Fno determining the resolution, and a sensor pitch (pixel pitch) of the solid-state image pickup element.

When the upper limit of Conditional Expression (1) is exceeded, there is a tendency for a difference between the focal length with respect to the light having the wavelength of 850 nm and the focal length with respect to the d-line to be large with respect to the sensor pitch. Therefore, a shift in focus position becomes large to make the defocus in the wavelength range from the visible light to the near-infrared light large, which makes it difficult to obtain the high resolving power (suppress the defocus) in the wavelength range from the visible light to the near-infrared. When the lower limit of Conditional Expression (1) is exceeded, there is a tendency for the shift in focus position in accordance with the sensor pitch to become small, but in order to realize this, a configuration in which many materials are used to correct an axial chromatic aberration is required, which makes it difficult to downsize the zoom lens, When the upper limit of Conditional Expression (2) is exceeded, there is a tendency for a difference between the focal length with respect to the light having the wavelength of 850 nm and the focal length with respect to the d-line to be large with respect to the sensor pitch, Therefore, it becomes difficult to correct the defocus in the wavelength range from a visible light region to a near-infrared region.

When the lower limit of Conditional Expression (2) is exceeded, there is a tendency for the shift in focus position in accordance with the sensor pitch to become small, but in order to realize this, the configuration in which many materials are used is required, which makes it difficult to downsize the zoom lens.

Conditional Expression (3) is set to reduce an effective lens diameter and realize the widening of the angle of field by making the lens sub-unit 1a have a relatively strong negative power (refractive power). In order to widen the angle of field, the focal length of the zoom lens at the wide angle end needs to be shortened. Therefore, in Embodiments, the negative refractive power of the lens sub-unit 1a that is closest to the object side is strengthened. When the negative refractive power of the lens sub-unit 1a becomes strong (an absolute value of the negative refractive power becomes large) and exceeds the upper limit of Conditional Expression (3), it becomes difficult to correct a curvature of field and a chromatic aberration in a balanced manner as the zoom lens, and to obtain high optical performance in the wide wavelength range, When the negative refractive power of the lens sub-unit 1a becomes weak (the absolute value of the negative refractive power becomes small) and exceeds the lower limit of Conditional Expression (3), it becomes difficult to widen the angle of field, a total lens length is lengthened, and further, an effective diameter of a front lens is increased.

In Embodiments, the above-mentioned configurations are adopted to obtain high optical performance over an entire zoom range with the small zoom lens. Further, there is obtained the image pickup apparatus including the zoom lens that reduces the defocus in the wide wavelength range from the visible light to the near-infrared light, maintains the high resolving power, and is bright over a wide angle of field. Note that, it is more preferred to set the numerical value ranges of Conditional Expressions (1) to (3) as follows.

$$3.0 < Fnow \cdot ((fwr-fw)/P) < 8.0 \quad (1a)$$

$$8.0 < Fnot \cdot ((ftr-ft)/P) < 25.0 \quad (2a)$$

$$-1.65 < f1a/\sqrt{(fw \cdot ft)} < -1.24 \quad (3a)$$

The zoom, lens as the object of the present invention is realized by satisfying the above-mentioned configurations. Further, it is preferred to satisfy one or more of the following conditions, A focal length of the lens sub-unit 1b with respect to the d-line (wavelength; 537.6 nm) is represented by f1b, and a focal length of the second lens unit with respect to the d-line (wavelength; 587.6 nm) is represented by f2. A focal length of the first lens unit with respect to the d-line (wavelength; 587.6 nm) is represented by f1, A movement amount of the first lens unit during zooming from the wide angle end to the telephoto end is represented by M1, and a movement amount of the second lens unit during the zooming from the wide angle end to the telephoto end is represented by M2.

The term "movement amount" as used herein represents a difference between a position of the lens unit at the wide angle end and a position of the lens unit at the telephoto end. A sign of the movement amount is positive when the lens unit is located on the image side at the telephoto end as compared to when at the wide angle end, A total lens length at the wide angle end is represented by OALw. The term "total lens length" refers to a value obtained by adding, to a distance from a first lens surface to a final lens surface (entire optical length), a back focus (air-converted length from the final lens surface to the image plane) with respect to the d-line (wavelength: 587.6 nm).

The lens sub-unit 1a consists of two negative lenses, of which at least one negative lens is formed of a material having a refractive index of 1.9 or more, the lens sub-unit 1b includes a negative lens and a positive lens, and a focal length of the lens sub-unit 1a with respect to the d-line (wavelength: 587.6 nm; is represented by f1a. The second lens unit L2 consists of, in order from the object side to the image side, two or more positive lenses, a negative lens, and a positive lens, and an average value of Abbe numbers of materials of the two or more positive lenses arranged in succession from the object side to the image side of the second lens unit L2 is represented by v2p.

The first lens unit L1 includes a cemented lens formed by cementing a positive lens and a negative lens, an Abbe number of a material of the negative lens forming the cemented lens is represented by v1n, and an Abbe number of a material of the positive lens forming the cemented lens is represented by v1p. Here, when refractive indices of the material with respect to the d-line, an F-line, and the C-line in a visible light range are represented by nd, nF, and nC, respectively, an Abbe number vd is defined by the following expression (A).

$$vd=(nd-1)/(nF-nC) \quad (A)$$

nd: refractive index with respect to d line (587.6 nm)
nF: refractive index with respect to F line (486.1 nm)
nC: refractive index with respect to C line (656.3 nm)

In this case, it is preferred to satisfy one or more of the following conditional expressions.

$$2.0 < f1b/f2 < 4.8 \quad (4)$$

$$9.3 < f1b/fw < 19.0 \quad (5)$$

$$-1.00 < f1/f2 < -0.65 \quad (6)$$

$$2.0 < M1/M2 < 4.5 \quad (7)$$

$$0.04 < M2/OALw < 0.15 \quad (8)$$

$$-0.28 < f1a/f1b < -0.10 \quad (9)$$

$$73.0 < v2p \quad (10)$$

$$20.0 < v1n - v1p < 48.0 \quad (11)$$

Next, the technical meanings of the above-mentioned conditional expressions are described. Conditional Expression (4) is set to satisfactorily correct various aberrations, which are generated by the lens sub-unit 1a having the strong negative refractive power that is set to widen the angle of field, with the lens sub-unit 1b and the second lens unit L2, which have positive refractive powers. In addition, Conditional Expression (4) sets the powers of the lens sub-unit 1b and the second lens unit L2, which have a lens unit interval that, is changed for zooming, in a balanced manner to obtain the high optical performance over an entire zoom range.

When the power of the second lens unit L2 becomes too strong and exceeds the upper limit of Conditional Expression (4), variations in curvature of field and spherical aberrations due to zooming become large. When the positive power of the lens sub-unit 1b becomes too strong and exceeds the lower limit of Conditional Expression (4), it becomes difficult to correct the various aberrations, in particular, the lateral chromatic aberration.

Conditional Expression (5) is set to reduce the focal length fw of the zoom lens at the wide angle end for widening the angle of field, and to appropriately set the positive power of the lens sub-unit 1b, When the positive power of the lens sub-unit 1b becomes too weak and exceeds the upper limit of Conditional Expression (5), the total lens length is lengthened, which makes it difficult to downsize the zoom lens, When the positive power of the lens sub-unit 1b becomes too strong and exceeds the lower limit of Conditional Expression (5), the curvature of field is increased.

Conditional Expressions (6) and (7) appropriately set the relationship of the second lens unit L2 for zooming and the first lens unit L1 for correcting an image plane position that varies accompanying the zooming. When the positive power of the second lens unit L2 becomes too weak and exceeds the upper limit of Conditional Expression (6), the movement amount of the second lens unit L2 for the zooming is increased, which makes it difficult to downsize the zoom lens. Alternatively, when the negative power of the first lens unit L1 becomes too strong, the curvature of field is increased.

On the other hand, when the power of the second lens unit L2 for zooming becomes strong and exceeds the lower limit of Conditional Expression (6), the spherical aberrations are increased and become difficult to correct. In addition, when the negative power of the first lens unit L1 becomes too weak, the interval between the first lens unit L1 and the second lens unit L2 needs to be set large for zooming, which increases the total lens length and makes it difficult to downsize the zoom lens, When the movement amount of the first lens unit L1 for zooming becomes too large and exceeds the upper-limit of Conditional Expression (7), the total lens length is increased and the effective diameter of the front lens is increased, which makes it difficult to downsize the zoom lens. When the movement amount of the first lens unit L1 for zooming becomes too short and exceeds the lower limit of Conditional Expression (7), the negative power of the first lens unit L1 needs to be strengthened to obtain a predetermined zoom ratio, with the result that the spherical aberrations, the curvature of field, and the like increase. Conditional Expression (8) sets the relationship of the movement amount of the second lens unit L2 for zooming and the total lens length at the wide angle end.

In Embodiments, the aperture stop SP is arranged between the first lens unit L1 and the second lens unit L2, and is configured, not to move for zooming. This eliminates the need to add a drive mechanism such, as a motor for moving an aperture stop mechanism, and facilitates the downsizing of the image pickup apparatus. When the movement amount of the second lens unit L2 becomes large and exceeds the upper limit of Conditional Expression (8), the total lens length is increased. Moreover, a position of the aperture stop SP is shifted to the object side. As a result, an off-axial ray is likely to be eclipsed, and hence an amount of ambient light is reduced to reduce the brightness, which is undesirable.

When the movement amount, of the second lens unit L2 becomes small and exceeds the lower limit of Conditional Expression (8), there arises a need to strengthen the positive power of the second lens unit L2 in order to obtain a desired zoom ratio, with the result that it becomes difficult to correct, the various aberrations such as the spherical aberrations.

Conditional Expression (9) expresses a ratio of the focal lengths of the lens sub-unit 1a and the lens sub-unit 1b, which form the first, lens unit L1. The lens sub-unit 1a is made to have the strong negative power for widening the angle of field, and is set to have a balanced ratio with respect to the positive power of the lens sub-unit 1b for suppressing the various aberrations in the first lens unit L1 as a whole. When the negative power of the lens sub-unit 1a becomes too strong and exceeds the upper limit of Conditional Expression (9), it becomes difficult to correct the various aberrations such as the spherical aberrations, a coma, and the curvature of field in the lens sub-unit 1b. When the negative power of the lens sub-unit 1a becomes too small and exceeds the lower limit of Conditional Expression (9), it becomes difficult to widen the angle of field.

Conditional Expression (10) relates to a material for correcting the chromatic aberration in the wide wavelength range from the visible light to the near-infrared light and correcting the defocus. The defocus caused by a difference in wavelength is generated under the effect of the so-called axial chromatic aberration, Lenses on the object side of the second lens unit L2 are in an area in which an incident height of an axial ray from the optical axis becomes highest. Therefore, materials that satisfy Conditional Expression (10) are used for a plurality of positive lenses in this area to effectively correct the axial chromatic aberration. When the lower limit of Conditional Expression (10) is exceeded, the chromatic aberration is undercorrected to increase the defocus of the near-infrared light (with respect to the visible light), which is undesirable.

Conditional Expression (11) is set to satisfactorily correct the chromatic aberration in the first lens unit L1. Conditional Expression (11) is satisfied to facilitate correction of the lateral chromatic aberration and the axial chromatic aberration over the entire zoom range. When the difference in Abbe number becomes too large and exceeds the upper limit of Conditional Expression (11), the chromatic aberration is overcorrected, which makes it difficult to correct the chromatic aberration over the entire zoom range in a balanced manner. When the difference in Abbe number becomes too small and exceeds the lower limit of Conditional Expression (11), the chromatic aberration is Undercorrected. Note that, it is preferred to set the numerical value ranges of Conditional Expressions (4) to (11) as follows, $$2.2 < f1b/f2 < 4.5 \quad (4a)$$

$$9.5 < f1b/fw < 18.0 \quad (5a)$$

$$-0.97 < f1/f2 < -0.68 \quad (6a)$$

$$2.1 < M1/M2 < 4.2 \quad (7a)$$

$$0.05 < M2/OALw < 0.12 \quad (8a)$$

$$-0.25 < f1a/f1b < -0.11 \quad (9a)$$

$$76.0 < v2p \quad (10a)$$

$$22.0 < v1n - v1p < 45 \quad (11a)$$

In Embodiments, it is preferred that the second lens unit L2 have two or more aspherical surfaces. This facilitates satisfactory correction of the spherical aberrations, which are likely to be generated when the f-number Fno is set small (bright). The lens sub-unit 1a may include two or more negative lenses. Moreover, the lens sub-unit 1b may include one or more negative lenses and one or more positive lenses, As described above, according to Embodiments, there may be obtained the image pickup apparatus that has an entire photographing angle of field that covers approximately 140° and the f-number Fno that covers approximately 1.2 at the wide angle end, and is capable of adapting to the solid-state image pickup element having the number of pixels of full HD or more.

The lens configurations in Embodiments are described as follows. In Embodiments, the first lens unit L1 consists of the lens sub-unit 1a and the lens sub-unit 1b. The lexis sub-unit 1a consists of a negative meniscus lens G11 having a convex surface on its object side, and a negative lens having a biconcave shape G12, For the negative lens G11, a glass material having a refractive index of about 1.9 to 2.0 is used, which facilitates the downsizing of the zoom lens and the widening of the angle of field.

The lens sub-unit 1b consists of a negative meniscus lens G13 having a convex surface on its object side, and a positive meniscus lens G14 having a convex surface on its object side. The negative lens G13 and the positive lens G14 are cemented to form, a cemented lens, and an appropriate difference in Abbe number is applied to the materials of the lenses to effectively correct the chromatic aberration. In Embodiments 1 and 2, the second lens unit L2 consists of, in order from the object side to the image side: a positive meniscus lens G21 having a convex surface on its object side; a positive lens having a biconvex shape G22; a positive lens having a biconvex shape G23; a negative lens having a biconcave shape G24; and a positive meniscus lens G25 having a convex surface on its object side.

Low dispersion materials are used for the positive lens G21, the positive lens G22, and the positive lens G23 to satisfactorily correct the axial, chromatic aberration in the wide wavelength range from the visible light to the near-infrared region. Further, the positive lens G23 and the negative lens G24 are cemented to form a cemented lens, and an appropriate difference in Abbe number is applied to the materials of the lenses to effectively correct the chromatic aberration.

In Embodiments 3 and 4, the second lens unit L2 consists of a positive lens having a biconvex shape G21, a positive lens having a biconvex shape G22, a negative meniscus lens G23 having a convex surface on its object side, a positive lens having a biconvex shape G24, and a negative lens having a biconcave shape G25. Low dispersion materials are used for the positive lens G21 and the positive lens G22 to satisfactorily correct, the axial chromatic aberration in the wide wavelength range from the visible light to the near-infrared region. Further, the positive lens G24 and the negative lens G25 are cemented to form a cemented lens, and an appropriate difference in Abbe number is applied to the materials of the lenses to satisfactorily correct the chromatic aberration.

Next, an example of a monitoring camera (image pickup apparatus) in which the zoom lens according to the present invention is used as a photographing optical system is described with reference to FIG. 10. In FIG. 10, the monitoring camera includes a monitoring camera main body 30 and a photographing optical system 31 consisting of the zoom lens described in any one of Embodiments 1 to 4. A solid-state image pickup element (photoelectric conversion element) 32, such as a CCD sensor or a CMOS sensor, is included in the camera main body to receive a subject image formed by the photographing optical system 31.

In this Embodiment, a high definition element of full HD (1,920×1,030) or the like is configured to obtain the high resolving power. In this Embodiment, the solid-state image pickup element in which one pixel pitch is 3.8 um (Embodiments 1 and 3) and 2.8 μm (Embodiments 2 and 4) is used. A memory 33 records information corresponding to the subject image that has been photoelectrically converted by the solid-state image pickup element 32. A network cable 34 transfers the subject image that has been captured and photoelectrically converted by the solid-state image pickup element 32.

As described above, according to Embodiments, there may be obtained the image pickup apparatus including the small zoom lens that has the nigh optical performance over the entire zoom range, reduces the defocus from the visible light to the near-infrared light, and is bright over the wide angle of field. Those Embodiments relate to the image pickup apparatus having the small zoom lens that has a maximum, angle of field 2ω that covers approximately 140° and the f-number Fno that covers approximately 1.2, and is capable of adapting to a high-pixel image pickup element of full HD or more. Note that, in Embodiments, the following configurations may be adopted.

Changing the lens shape and the number of lenses as appropriate without limiting to those described in Embodiments.

Configuring the aperture stop SP to be moved.

Using, without limiting a material of an aspherical lens to glass, a hybrid type aspherical lens in which an aspherical surface is formed (aspheric component is applied) on a spherical lens surface with a resin material, or an aspherical lens formed of a plastic material.

Correcting an image blur accompanying a vibration such as camera shake by moving some of the lenses and the lens units so as to have a component in a direction perpendicular to the optical axis.

Correcting the distortions and the lateral chromatic aberration by an electric correction unit.

Focusing by moving the lens sub-unit 1a and the lens sub-unit 1b independently or with the second lens unit L2.

Focusing by moving the two lens units.

Although the exemplary embodiments of the present invention have been described so far, the present invention is by no means limited to those embodiments or optical specifications (angle of field and Fno), and hence various changes and modifications can be made within the scope of the subject matter of the present invention.

Next, Numerical Embodiments corresponding respectively to Embodiments are described. In each Numerical Embodiment, surface number i indicates the order of an optical plane from the object side. Symbol ri represents a curvature radius of the optical plane; di, a plane interval; and ndi and vdi, a refractive index and an Abbe number of a material of an optical member with respect to the d-line, respectively. Symbol * represents the aspherical lens. Further, two optical planes that are the closest to the image side are glass materials such as face plates. Back focus (BF) is an air-converted distance between a final lens surface and a paraxial image plane. The total lens length is a value obtained by adding the back focus (BF) to a distance between a front lens surface and the final lens surface.

In addition, symbol K represents an eccentricity, symbols A4, A6, A8, A10, and A12 represent aspherical coefficients, and a displacement in the optical axis direction at a position of height H from the optical axis with respect to a surface apex is represented by symbol x. Then, an aspherical shape is expressed by the following Expression.

$$X = \frac{(1/R)H^2}{1 + \sqrt{1 - (1+K)(H/R)^2}} + A4H^4 + A6H^6 + A8H^8 + A10H^{10} + A12H^{12}$$

where R represents a curvature radius. Further, for example, the expression of "e-Z" means "$10^{-z}$". In addition, a relationship between the conditional expressions described above and Embodiments (Numerical Embodiments) is shown in Table 1. Symbol Fno represents the f-number, and the half angle of field (ω) is a numerical value concerning an angle of field that can be photographed in consideration of an amount of distortion. Focal length (850 nm) represents the focal length with respect to the light having the wavelength of 850 nm.

Numerical Embodiment 1

| Unit: mm | | | | |
|---|---|---|---|---|
| Surface data | | | | |
| Surface number | r | d | nd | vd |
| 1 | 22.984 | 0.9 | 2.00100 | 29.1 |
| 2 | 7.082 | 6.36 | | |
| 3 | −20.976 | 0.6 | 1.69680 | 55.5 |
| 4 | 44.586 | 0.9 | | |
| 5 | 29.567 | 0.7 | 1.77250 | 49.6 |
| 6 | 13.3 | 2.26 | 1.94595 | 18.0 |
| 7 | 64.812 | (Variable) | | |
| 8 (Stop) | ∞ | (Variable) | | |
| 9* | 9.377 | 3.2 | 1.55332 | 71.7 |
| 10* | 51.911 | 0.15 | | |
| 11 | 10.382 | 3.08 | 1.49700 | 81.5 |
| 12 | −27.191 | 0.15 | | |
| 13 | 10.542 | 2.62 | 1.49700 | 81.5 |
| 14 | −70.63 | 0.6 | 1.84666 | 23.8 |
| 15 | 5.744 | 1.37 | | |
| 16* | 7.394 | 2.52 | 1.76802 | 49.2 |
| 17* | 77.541 | (Variable) | | |
| 18 | ∞ | 2 | 1.52 | 61.4 |
| 19 | ∞ | | | |

| Aspherical surface data |
|---|
| Ninth surface |

| K = −6.55588e−001 | A4 = 8.07646e−005 | A6 = 4.93643e−006 |
|---|---|---|
| A8 = −1.50086e−007 | A10 = 3.21825e−009 | A12 = 9.00619e−022 |

Tenth surface

| K = 2.89983e+001 | A4 = 2.93716e−004 | A6 = 7.32800e−006 |
|---|---|---|
| A8 = −2.53707e−007 | A10 = 6.12086e−009 | |

Sixteenth surface

| K = 0.00000e+000 | A4 = 2.97811e−004 | A6 = 6.65720e−007 |
|---|---|---|
| A8 = −1.50538e−007 | A10 = 5.97715e−009 | |

Seventeenth surface

| K = 0.00000e+000 | A4 = 7.29586e−004 | A6 = 5.07932e−006 |
|---|---|---|
| A8 = −3.26314e−007 | A10 = 2.16244e−008 | |

Unit: mm

Various data
Zoom ratio 2.33

|  | Wide angle | Intermediate | Telephoto |
|---|---|---|---|
| Focal length | 2.64 | 4.39 | 6.14 |
| Focal length (850 nm) | 2.654 | 4.414 | 6.173 |
| Fno | 1.23 | 1.48 | 1.83 |
| Half angle of field (ω)° | 70.6 | 39.8 | 28.0 |
| Image height | 3 | 3 | 3 |
| Total lens length | 50.31 | 41.44 | 38.89 |
| BF | 4.60 | 6.80 | 9.00 |
| Interval |  |  |  |
| d7 | 15.76 | 6.9 | 4.35 |
| d8 | 4.53 | 2.33 | 0.13 |
| d17 | 2.18 | 4.38 | 6.58 |

Focal length of units

| Unit 1 | −7.63 |
|---|---|
| Unit 2 | 9.60 |
| Unit 1a | −5.77 |
| Unit 1b | 39.60 |

Pixel pitch of solid-state image pickup element: 0.0038 [mm]

Numerical Embodiment 2

Unit: mm

Surface data

| Surface number | r | d | nd | vd |
|---|---|---|---|---|
| 1 | 26.655 | 1 | 1.91082 | 35.3 |
| 2 | 7.117 | 6.95 |  |  |
| 3 | −22.529 | 0.7 | 1.80400 | 46.6 |
| 4 | 36.389 | 0.74 |  |  |
| 5 | 32.611 | 0.7 | 1.65160 | 58.5 |
| 6 | 17.039 | 2.4 | 1.95906 | 17.5 |
| 7 | 131.975 | (Variable) |  |  |
| 8 (Stop) | ∞ | (Variable) |  |  |
| 9* | 9.039 | 2.93 | 1.49710 | 81.6 |
| 10* | 2089.491 | 0.15 |  |  |
| 11 | 10.921 | 3.14 | 1.49700 | 81.5 |
| 12 | −26.161 | 0.17 |  |  |
| 13 | 14.295 | 2.48 | 1.59282 | 68.6 |
| 14 | −49.598 | 0.6 | 1.80518 | 25.4 |
| 15 | 5.821 | 1.45 |  |  |
| 16* | 6.432 | 2.47 | 1.69350 | 53.2 |
| 17* | 29.377 | (Variable) |  |  |
| 18 | ∞ | 2 | 1.52 | 61.4 |
| 19 | ∞ |  |  |  |

Aspherical surface data

Ninth surface

K = −4.99950e−001   A4 = −2.59729e−005   A6 = 3.90872e−006
A8 = −1.18213e−007   A10 = 2.77325e−009   A12 = 9.48551e−022

Tenth surface

K = 2.85610e+003   A4 = 2.59316e−004   A6 = 5.19909e−006
A8 = −1.55089e−007   A10 = 3.83500e−009

Sixteenth surface

K = 0.00000e+000   A4 = 3.31891e−004   A6 = 1.52830e−005
A8 = −3.32980e−007   A10 = 1.09936e−008

Seventeenth surface

K = 0.00000e+000   A4 = 1.04867e−003   A6 = 3.72203e−005
A8 = −6.08589e−008   A10 = 6.35888e−009

Various data
Zoom ratio 2.28

|  | Wide angle | Intermediate | Telephoto |
|---|---|---|---|
| Focal length | 2.65 | 4.35 | 6.04 |
| Focal length (850 nm) | 2.668 | 4.369 | 6.070 |
| Fno | 1.24 | 1.52 | 1.83 |
| Half angle of field (ω)° | 71.4 | 40.3 | 28.5 |
| Image height | 3 | 3 | 3 |
| Total lens length | 49.97 | 41.47 | 38.91 |
| BF | 4.60 | 6.69 | 8.78 |
| Interval |  |  |  |
| d7 | 15.15 | 6.65 | 4.09 |
| d8 | 4.34 | 2.24 | 0.15 |
| d17 | 2.67 | 4.76 | 6.86 |

Focal length of units

| Unit 1 | −7.64 |
|---|---|
| Unit 2 | 9.45 |
| Unit 1a | −5.37 |
| Unit 1b | 32.25 |

Pixel pitch of solid-state image pickup element: 0.0028 [mm]

Numerical Embodiment 3

Unit: mm

Surface data

| Surface number | r | d | nd | vd |
|---|---|---|---|---|
| 1 | 22.774 | 1 | 2.00100 | 29.1 |
| 2 | 7.143 | 6.24 |  |  |
| 3 | −19.192 | 0.75 | 1.69680 | 55.5 |
| 4 | 35.13 | 0.55 |  |  |
| 5 | 26.798 | 0.7 | 1.83481 | 42.7 |
| 6 | 16.276 | 2.6 | 1.94595 | 18.0 |
| 7 | 467.837 | (Variable) |  |  |
| 8 (Stop) | ∞ | (Variable) |  |  |
| 9* | 9.792 | 2.8 | 1.55332 | 71.7 |
| 10* | −57.903 | 0.15 |  |  |
| 11 | 12.167 | 4.29 | 1.43875 | 94.9 |
| 12 | −9.436 | 0.15 |  |  |
| 13 | 54.169 | 0.6 | 1.80518 | 25.4 |
| 14 | 7.302 | 0.89 |  |  |
| 15* | 9.246 | 3.61 | 1.85135 | 40.1 |
| 16 | −6.55 | 0.7 | 1.71736 | 29.5 |
| 17 | 12.431 | (Variable) |  |  |
| 18 | ∞ | 2 | 1.52 | 61.4 |
| 19 | ∞ |  |  |  |

Aspherical surface data

Ninth surface

K = 8.26660e−001   A4 = −3.86214e−004   A6 = −5.75620e−006
A8 = 2.10758e−007   A10 = −1.30207e−008

Tenth surface

K = −6.70555e+001   A4 = 9.65837e−005   A6 = 4.77782e−006
A8 = −1.32792e−008   A10 = −3.01104e−009

-continued

Unit: mm

Fifteenth surface

K = 0.00000e+000    A4 = −4.25532e−004    A6 = −8.72201e−006
A8 = −2.48290e−007  A10 = 1.11843e−009

Various data
Zoom ratio 2.30

|  | Wide angle | Intermediate | Telephoto |
|---|---|---|---|
| Focal length | 2.66 | 4.38 | 6.11 |
| Focal length (850 nm) | 2.673 | 4.407 | 6.134 |
| Fno | 1.23 | 1.48 | 1.79 |
| Half angle of field ($\omega$)° | 69.9 | 39.5 | 28.0 |
| Image height | 3 | 3 | 3 |
| Total lens length | 49.63 | 40.43 | 37.47 |
| BF | 4.55 | 6.41 | 8.26 |
| Interval | | | |
| d7 | 16.19 | 6.98 | 4.03 |
| d8 | 3.86 | 2.01 | 0.15 |
| d17 | 1.9 | 3.75 | 5.61 |

Focal length of units

| Unit 1 | −8.33 |
|---|---|
| Unit 2 | 8.95 |
| Unit 1a | −5.50 |
| Unit 1b | 27.77 |

Pixel pitch of solid-state image pickup element: 0.0038 [mm]

Numerical Embodiment 4

Unit: mm

Surface data

| Surface number | r | d | nd | vd |
|---|---|---|---|---|
| 1 | 24.047 | 0.9 | 2.001 | 29.1 |
| 2 | 7.353 | 7.01 | | |
| 3 | −24.08 | 0.7 | 1.7725 | 49.6 |
| 4 | 24.065 | 0.69 | | |
| 5 | 24.288 | 0.65 | 1.804 | 46.6 |
| 6 | 13.598 | 2.28 | 1.94595 | 18 |
| 7 | 120.503 | (Variable) | | |
| 8 (Stop) | ∞ | (Variable) | | |
| 9* | 12.443 | 2.81 | 1.55332 | 71.7 |
| 10* | −29.787 | 0.16 | | |
| 11 | 15.928 | 4.5 | 1.437 | 95.1 |
| 12 | −9.931 | 0.17 | | |
| 13 | 17.962 | 0.45 | 1.80518 | 25.4 |
| 14 | 6.453 | 1.27 | | |
| 15* | 10.71 | 3.82 | 1.76802 | 49.2 |
| 16 | −6.356 | 0.5 | 1.64769 | 33.8 |
| 17 | 18.829 | (Variable) | | |
| 18 | ∞ | 2 | 1.52 | 61.4 |
| 19 | ∞ | | | |

Aspherical surface data

Ninth surface

K = 8.26660e−001    A4 = 4.23176e−004    A6 = 2.88839e−006
A8 = −3.05032e−007  A10 = 8.11233e−010   A12 = −5.64734e−022

Tenth surface

K = −3.69492e+001   A4 = −7.35824e−005   A6 = 1.01272e−005
A8 = −4.04496e−007  A10 = 4.87591e−009

-continued

Unit: mm

Fifteenth surface

K = 0.00000e+000    A4 = −1.04740e−004    A6 = 1.89175e−006
A8 = −3.37175e−007  A10 = 1.13174e−008

Various data
Zoom ratio 2.31

|  | Wide angle | Intermediate | Telephoto |
|---|---|---|---|
| Focal length | 2.57 | 4.25 | 5.94 |
| Focal length (850 nm) | 2.580 | 4.274 | 5.959 |
| Fno | 1.23 | 1.47 | 1.73 |
| Half angle of field ($\omega$)° | 74.2 | 41.8 | 29.4 |
| Image height | 3.04 | 3.04 | 3.04 |
| Total lens length | 52.66 | 43.59 | 40.92 |
| BF | 5.68 | 7.89 | 10.11 |
| Interval | | | |
| d7 | 14.32 | 5.24 | 2.58 |
| d8 | 6.76 | 4.55 | 2.33 |
| d17 | 1.93 | 4.14 | 6.36 |

Focal length of units

| Unit 1 | −7.46 |
|---|---|
| Unit 2 | 9.80 |
| Unit 1a | −5.05 |
| Unit 1b | 27.73 |

Pixel pitch of solid-state image pickup element: 0.0028 [mm]

Table 1 shows a relationship between the conditional expressions described above and Embodiments (Numerical Embodiments).

TABLE 1

|  | Conditional Expression | Embodiment 1 | 2 | 3 | 4 |
|---|---|---|---|---|---|
| (1) | Fnow · ((fwr − fw)/p) | 4.39 | 6.11 | 5.04 | 6.25 |
| (2) | Fnot · ((ftr − ft)/p) | 16.17 | 19.00 | 10.36 | 14.24 |
| (3) | f1a/√(fw · ft) | −1.43 | −1.34 | −1.36 | −1.29 |
| (4) | f1b/f2 | 4.13 | 3.41 | 3.10 | 2.83 |
| (5) | f1b/fw | 15.00 | 12.15 | 10.45 | 10.81 |
| (6) | f1/f2 | −0.80 | −0.81 | −0.93 | −0.76 |
| (7) | M1/M2 | 2.59 | 2.64 | 3.28 | 2.65 |
| (8) | M2/OALw | 0.09 | 0.08 | 0.07 | 0.08 |
| (9) | f1a/f1b | −0.15 | −0.17 | −0.20 | −0.18 |
| (10) | v2p | 78.25 | 77.24 | 83.31 | 83.39 |
| (11) | v1n − v1p | 31.62 | 41.08 | 24.75 | 28.60 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095810, filed May 7, 2014, which is hereby incorporated by reference herein in its entirety.

What is claimed is:

1. An image pickup apparatus, comprising;
a zoom lens; and
a solid-state image pickup element configured to receive an image formed by the zoom lens,
the zoom lens comprising, in order from an object side to an image side:
a first lens unit having a negative refractive power;
an aperture stop; and a second lens unit having a positive refractive power, the first lens unit consisting of, in order from the object side to the image side, a first lens sub-unit having a negative refractive power, which consists of two negative lenses, and a second lens sub-unit having a positive refractive power, the first lens unit and the second lens unit being configured to move along different loci during zooming, wherein the following conditional expressions are satisfied:

$1.5 < Fnow \cdot ((fwr-fw)/P) < 9.5;$ $5.0 < Fnot \cdot ((ftr-ft)/P) < 28.0;$ and $-1.80 < f1a/\sqrt{(fw \cdot ft)} < -1.22,$ where Fnow represents a full-open f-number of the zoom lens at a wide angle end, Fnot represents a full-open f-number of the zoom lens at a telephoto end, fw represents a focal length of the zoom lens at the wide angle end with respect to a d-line of a wavelength of 587.6 nm, ft represents a focal length of the zoom lens at the telephoto end with respect to the d-line of the wavelength of 587.6 nm, fwr represents a focal length of the zoom lens at the wide angle end with respect to light having a wavelength of 850 nm, ftr represents a focal length of the zoom lens at the telephoto end with respect to the light of the wavelength of 850 nm, f1a represents a focal length of the first lens sub-unit with respect to the d-line of the wavelength of 587.6 nm, and P represents a pixel pitch of the solid-state image pickup element.

2. An image pickup apparatus according to claim 1, wherein the following conditional expression is satisfied;

$2.0 < f1b/f2 < 4.8,$ where f1b represents a focal length of the second lens sub-unit with respect to the d-line of the wavelength of 587.6 nm, and f2 represents a focal length, of the second lens unit with respect to the d-line of the wavelength of 587.6 nm.

3. An image pickup apparatus according to claim 1, wherein the following conditional expression is satisfied;

$9.3 < f1b/fw < 19.0,$ where f1b represents a focal length of the second lens sub-unit with respect to the d-line of the wavelength of 587.6 nm.

4. An image pickup apparatus according to claim 1, wherein the following conditional expressions are satisfied:

$-1.00 < f1/f2 < -0.65;$ and $2.0 < M1/M2 < 4.5,$ where f1 represents a focal length of the first lens unit with respect to the d-line of the wavelength of 587.6 nm, and f2 represents a focal length of the second lens unit with respect to the d-line of the wavelength of 587.6 nm. M1 represents a movement amount of the first lens unit during zooming from the wide single end to the telephoto end, and M2 represents a movement amount of the second lens unit during the zooming from the wide angle end to the telephoto end.

5. An image pickup apparatus according to claim 1, wherein the aperture stop is configured not to move for zooming, and wherein the following conditional expression is satisfied:

$0.04 < M2/OALw < 0.15,$ where OALw represents a total lens length at the wide angle end.

6. An image pickup apparatus according to claim 1, wherein at least one negative lens included in the first lens sub-unit is formed of a material having a refractive index of 1.9 or larger, and wherein the following conditional expression is satisfied:

$-0.28 < f1a/f1b < -0.10,$ where f1a represents a focal length of the first lens sub-unit with respect to the d-line of the wavelength of 587.6 nm, and f1b represents a focal length of the second lens sub-unit with respect to the d-line of the wavelength of 587.6 nm.

7. An image pickup apparatus according to claim 1, wherein the second lens unit comprises, in order from the object side to the image side, at least two positive lenses, a negative lens, and a positive lens, and wherein the following conditional expression is satisfied:

$73.0 < v2p,$ where v2p represents an average value of Abbe numbers of materials of the at least two positive lenses arranged in succession from the object side to the image side of the second lens unit.

8. An image pickup apparatus according to claim 1, wherein the first lens unit comprises a cemented lens formed by cementing a positive lens and a negative lens, and wherein the following conditional expression is satisfied:

$20.0 < v1n - v1p < 48.0,$ where v1n represents an Abbe number of the negative lens forming the cemented lens, and v1p represents an Abbe number of a material of the positive lens forming the cemented lens.

* * * * *